(12) United States Patent
Kawanishi et al.

(10) Patent No.: US 7,864,330 B2
(45) Date of Patent: Jan. 4, 2011

(54) METHOD AND DEVICE FOR CALIBRATING A LIGHT INTENSITY MEASUREMENT DEVICE

(75) Inventors: Tetsuya Kawanishi, Tokyo (JP); Masayuki Izutsu, Tokyo (JP); Takahide Sakamoto, Tokyo (JP); Masahiro Tsuchiya, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 309 days.

(21) Appl. No.: 12/095,378

(22) PCT Filed: Nov. 24, 2006

(86) PCT No.: PCT/JP2006/323465
§ 371 (c)(1),
(2), (4) Date: Jun. 19, 2008

(87) PCT Pub. No.: WO2007/063776
PCT Pub. Date: Jun. 7, 2007

(65) Prior Publication Data
US 2009/0290148 A1    Nov. 26, 2009

(30) Foreign Application Priority Data
Nov. 29, 2005    (JP) .............................. 2005-344034

(51) Int. Cl.
*G01B 9/02* (2006.01)
(52) U.S. Cl. ...................................... 356/478
(58) Field of Classification Search ................ 356/450, 356/477, 478
See application file for complete search history.

(56) References Cited

U.S. PATENT DOCUMENTS 5,148,233 A    9/1992    Imamura et al.

(Continued)

FOREIGN PATENT DOCUMENTS

JP    58-68637    4/1983

(Continued)

OTHER PUBLICATIONS

Tetsuya Kawanishi, et al. "Ultra High Extinction Ratio Intensity Modulation Using Optical FSK Modulator" IEICE Technical Report, vol. 105, No. 243 (OCS2005 35-45), Aug. 19, 2005, pp. 41-44.

(Continued)

*Primary Examiner*—Gregory J Toatley
*Assistant Examiner*—Scott M Richey
(74) *Attorney, Agent, or Firm*—Myers Wolin, LLC

(57) ABSTRACT

It is an object of the present invention to provide a method and a device for automatically calibrating a light intensity measurement device. The device (1) includes an optical switch (3) for switching a route of output from an optical intensity modulator (2), an optical attenuator (5) arranged on a first waveguide (4), a second waveguide (6), a light intensity measurement device (7), a control device (8) for receiving light intensity information measured by the light intensity measurement device (7) and controlling the signal to be applied to the optical intensity modulator (2), and a signal source (9) for receiving a control signal of the control device (8) and adjusting the signal to be applied to the optical intensity modulator (2).

4 Claims, 2 Drawing Sheets

U.S. PATENT DOCUMENTS

| | | | |
|---|---|---|---|
| 5,838,437 A * | 11/1998 | Miller et al. | 356/478 |
| 6,061,124 A * | 5/2000 | Nyman et al. | 356/124 |
| 6,559,946 B2 * | 5/2003 | Davidson et al. | 356/477 |
| 6,606,158 B2 * | 8/2003 | Rosenfeldt et al. | 356/477 |
| 6,714,566 B1 * | 3/2004 | Coldren et al. | 372/20 |
| 6,943,891 B2 * | 9/2005 | VanWiggeren | 356/477 |
| 6,985,234 B2 * | 1/2006 | Anderson | 356/477 |
| 7,064,839 B2 * | 6/2006 | Bussard et al. | 356/477 |
| 7,499,182 B2 * | 3/2009 | Zeng et al. | 356/519 |
| 7,589,840 B2 * | 9/2009 | Zeng | 356/454 |
| 2004/0001194 A1 * | 1/2004 | Wilstrup et al. | 356/73.1 |

FOREIGN PATENT DOCUMENTS

| | | |
|---|---|---|
| JP | 64-35323 | 2/1989 |
| JP | 3-218433 | 9/1991 |
| JP | 6-30733 | 4/1994 |

OTHER PUBLICATIONS

Tetsuya Kawanishi, et al. "Generation of double sideband radio-on-fiber signal with large carrier suppression ratio" National Institute of Information and Communications Technology, vol. 205, Sep. 7, 2005, p.S-61-S-62.

International Search Report dated Feb. 14, 2007 of the corresponding International application No. PCT/JP2006/323465 with English Translation of the Written Opinion of the International Searching Authority.

* cited by examiner

METHOD AND DEVICE FOR CALIBRATING A LIGHT INTENSITY MEASUREMENT DEVICE

CROSS REFERENCE TO RELATED APPLICATIONS

The present disclosure is a national phase filing under 35 U.S.C. §371 of International Patent Application No. PCT/JP2006/323465 filed on Nov. 24, 2006, which claims priority to Japanese Patent Application No. 2005-344034 filed on Nov. 29, 2005, the disclosures of which are expressly incorporated herein by reference in its entireties.

BACKGROUND OF THE INVENTION

1. Field of the Invention

The present invention relates to a method and a device for calibrating a light intensity measurement device. In particular, the present invention relates to a method for calibrating a light intensity measurement device by using an optical intensity modulator having ultra high extinction ratio. It also relates to a device which is configured to perform calibration operations automatically.

2. Description of the Related Art

A light intensity measurement device is not always in a desirable operational condition due to heat generated by the continuous operation of the device or changes in its operating environment. Therefore, it is desirable to examine characteristics of a light intensity measurement device as needed, and adjust the device if required. However, light intensity measurement devices have been used without calibration. There is also a problem that it takes time to perform calibration since a variable attenuator which requires mechanical operation is used.

The object of this invention is to provide a new method and device for calibrating a light intensity measurement device.

The object of this invention is preferably to provide a method and device for automatically calibrating a light intensity measurement device.

The object of this invention is to provide a method and device for calibrating a light intensity measurement device which can perform calibration automatically based on feed back control, especially, by means of an optical intensity modulator with high extinction ratio.

SUMMARY OF THE INVENTION

The present invention is basically based on the following idea. A light intensity of input light is attenuated by an optical attenuator (5). Then, the intensity is measured by a light intensity measurement device (7), and the measured light intensity is stored in a control device (8). Then, a waveguide is switched to a waveguide (6) not having the optical attenuator (5) by an optical switch (3), and a signal applied to an optical intensity modulator (2) is adjusted so that the light intensity of the signal becomes equal to the measured light intensity stored in the control device (8). By repeating one or a plurality of times of the above procedure, calibration can be automatically and effectively performed.

In order to solve the problems above mentioned, a calibration device (1) for a light intensity measurement device according to the first aspect of the present invention comprises: an optical switch (3) for switching output paths from an optical intensity modulator (2); a first waveguide (4) being switched by the optical switch (3); an optical attenuator (5) being provided on the first waveguide; a second waveguide (6) being switched by the optical switch (3); a light intensity measurement device (7) being connected to the first waveguide (4) and the second waveguide (6) and measuring light intensity of light propagating through the first waveguide (4) or the second waveguide (6); a control device (8) receiving the light intensity measured by the light intensity measurement device (7) and controlling a signal being applied to the optical intensity modulator (2); and a signal source (9) receiving control signal from the control device (8) and adjusting signal being applied to the optical intensity modulator (2).

In order to solve the problems above mentioned, the following calibration device (1) for a light intensity measurement device is used in a calibration method for a light intensity measurement device according to the second aspect of the present invention.

The calibration device (1) for a light intensity measurement device comprises: an optical switch (3) for switching output paths from an optical intensity modulator (2); a first waveguide (4) being switched by the optical switch (3); an optical attenuator (5) being provided on the first waveguide (4); a second waveguide (6) being switched by the optical switch (3); a light intensity measurement device (7) being connected to the first waveguide (4) and the second waveguide (6) and measuring light intensity of light propagating through the first waveguide (4) or the second waveguide (6); a control device (8) receiving the light intensity measured by the light intensity measurement device (7), the control device controlling a signal being applied to the optical intensity modulator (2); and a signal source (9) receiving control signal from the control device (8) and adjusting signal being applied to the optical intensity modulator (2).

And in the calibration method for a light intensity measurement device, one or a plurality of times of the following cycle is performed. The cycle comprises the steps of: controlling the optical switch (3) so that waveguide is switched to the first waveguide (4); making the optical attenuator (5) perform a certain amount of optical attenuation; receiving and storing the light intensity measured by the light intensity measurement device (7); controlling the optical switch (3) so that the waveguide is switched to the second waveguide (6); and controlling the signal being applied to the optical intensity modulator (2) so that the light intensity measured by the light intensity measurement device (7) becomes equal to the stored light intensity.

This invention can provide a new method and a device for calibrating a light intensity measurement device which, for example, adjusts light intensity gradually.

This invention can provide a method and a device for automatically calibrating a light intensity measurement device, since the device and the method of the present invention can maintain a desirable extinction ratio by feed back control as needed.

This invention can adjust light intensity gradually. Therefore, this invention can provide a method and a device for calibrating a light intensity measurement device which can perform calibration automatically based on feed back control.

BREIF DESCRIPTION OF THE DRAWINGS

DESCRIPTION OF THE PREFFERED EMBODIMENTS

Figure 1:
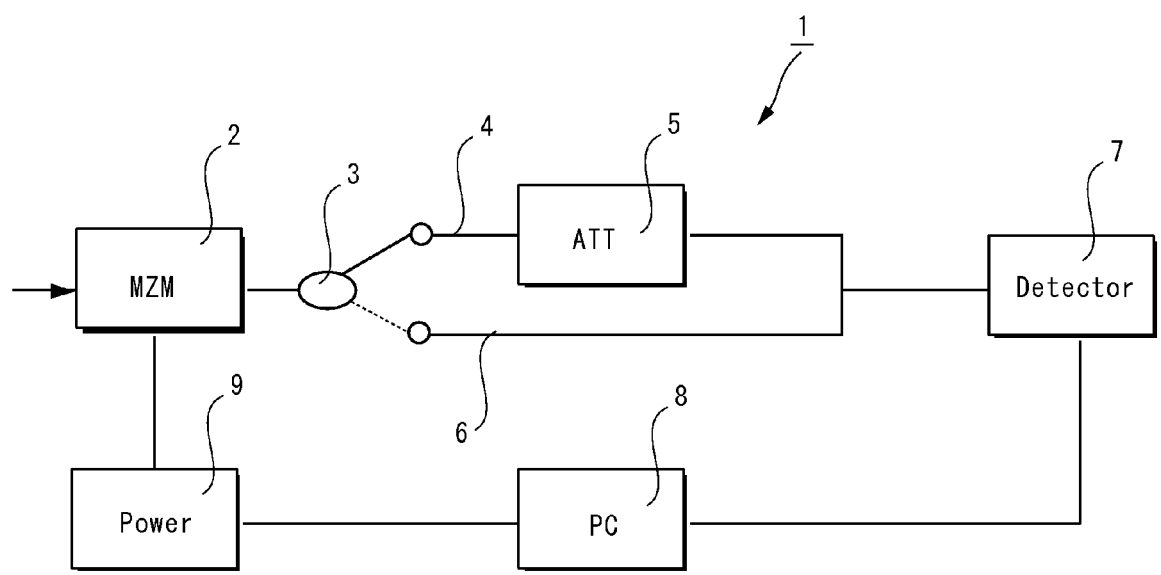
FIG. 1 is a block diagram showing a light intensity measurement device comprising the calibration device according to the first aspect of the present invention.

FIG. 1 is a block diagram showing a light intensity measurement device comprising the calibration device according to the first aspect of the present invention.

As shown in FIG. 1, the calibration device for a light intensity measurement device comprises: an optical switch (3) for switching output paths from an optical intensity modulator (2); a first waveguide (4) being switched by the optical switch (3); an optical attenuator (5) being provided on the first waveguide; a second waveguide (6) being switched by the optical switch (3); a light intensity measurement device (7) being connected to the first waveguide (4) and the second waveguide (6) and measuring light intensity of light propagating through the first waveguide (4) or the second waveguide (6); a control device (8) receiving the light intensity measured by the light intensity measurement device (7) and controlling a signal being applied to the optical intensity modulator (2); and a signal source (9) receiving control signal from the control device (8) and adjusting signal being applied to the optical intensity modulator (2).

A light intensity measurement device comprising a calibration device of the present invention is a light intensity measurement device comprising the above calibration device (1).

As for the calibration method for a light intensity measurement device of the present invention, the method performs one or a plurality of times of the following cycle comprising the steps of: controlling the optical switch (3) so that waveguide is switched to the first waveguide (4); making the optical attenuator (5) perform a certain amount of optical attenuation; receiving and storing the light intensity measured by the light intensity measurement device (7); controlling the optical switch (3) so that waveguide is switched to the second waveguide (6); and controlling the signal being applied to the optical intensity modulator (2) so that the light intensity measured by the light intensity measurement device (7) becomes equal to the stored light intensity.

Calibration Device

The calibration device (1) is a device for adjusting the light intensity measurement device (7) preferably automatically and desirably. The calibration device (1) may be provided on the same substrate with the light intensity measurement device (7), or may be connected to the light intensity measurement device (7).

Optical Intensity Modulator

The optical intensity modulator (2) is a device for modulating light intensity. As the optical intensity modulator (2), a publicly known optical intensity modulator can be used, and the one having Mach-Zehnder waveguides can be adopted.

An optical intensity modulator having a Mach-Zehnder waveguide can modulate light intensity of high-speed output light easely by adjusting electric signals applied to electrodes. The optical intensity modulator having a Mach-Zehnder waveguide comprises a Mach-Zehnder waveguide including two arms, and electrodes for adjusting phases by applying electric field to optical signals propagating through the two arms, wherein controlled signals controlled by a control part is applied to the electrodes from a signal source described below. An optical intensity modulator having a Mach-Zehnder waveguide, for example, has relatively high extinction ratio (e.g., about 20 dB to 30 dB). Therefore the optical intensity modulator can be effectively used for the calibration of the present invention.

Figure 2:
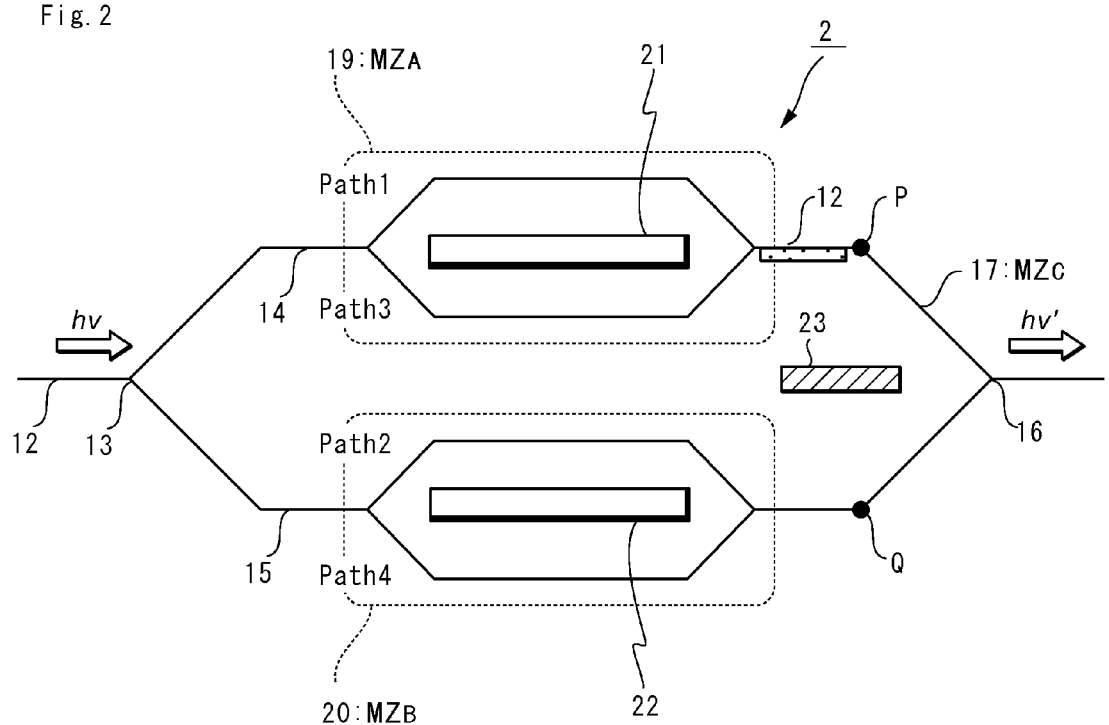
FIG. 2 is a schematic diagram showing an optical intensity modulator according to a certain embodiment of the present invention.

FIG. 2 is a schematic diagram showing an optical intensity modulator according to a certain embodiment of the present invention. This optical intensity modulator has high extinction ratio (e.g., about 70 dB). Therefore, it is particularly suitable for the calibration of the present invention. An optical intensity modulator having high extinction ratio is required for performing a wide range of calibration. The optical intensity modulator shown in FIG. 2 can realize quite high level of extinction ratio, thereby performing calibration effectively. In addition, the optical intensity modulator shown in FIG. 2 can perform intensity modulation easily by adjusting electric signals applied to each electrode. The intensity modulation by electric signals is performed rapidly and easily. Therefore, the optical intensity modulator is suitable for the optical intensity modulator of the present invention.

As shown in FIG. 2, the optical intensity modulator of this embodiment comprises: an input part (12) of an optical signal; a main Mach-Zehnder waveguide ($MZ_C$) (17); an output part (18); a first intensity modulator (19); a second intensity modulator (20); a first electrode (electrode A) (21) of the first intensity modulator (19); a second electrode (electrode B) (22) of the second intensity modulator (20); a third electrode (electrode C) (23) of the main Mach-Zehnder (17); and a signal source part (26). The main Mach-Zehnder waveguide ($MZ_C$) (17) comprises a branching part (13) for branching the optical signal, a first arm (14) wherein an optical signal branched by the branching part (13) propagates, a second arm (15) wherein the other optical signal branched by the branching part (13) propagates, and a combining part (16) wherein the optical signals outputted from the first arm (14) and the second arm (15) are combined. The output part (18) is a part wherein the optical signal combined by a combining part (16) is outputted. The first intensity modulator (19) is provided on the first arm (14) and controls amplitude of the optical signal propagating through the first arm (14). The second intensity modulator (20) is provided on the second arm (15) and controls amplitude of the optical signal propagating through the second arm (15). The third electrode (electrode C) (23) is an electrode wherein a modulation signal controlling a phase difference between the optical signals propagating respectively through the first arm (14) and the second arm (15) is applied. The signal source part (26) comprises a first signal source and the second signal source. The first signal source applies bias voltage to the first electrode (electrode A) (21), the second electrode (electrode B) (22), and the third electrode (electrode C) (23). The second signal source (high frequency signal source) applies a radio frequency signal to the third electrode (electrode C) (23).

Figure 3:
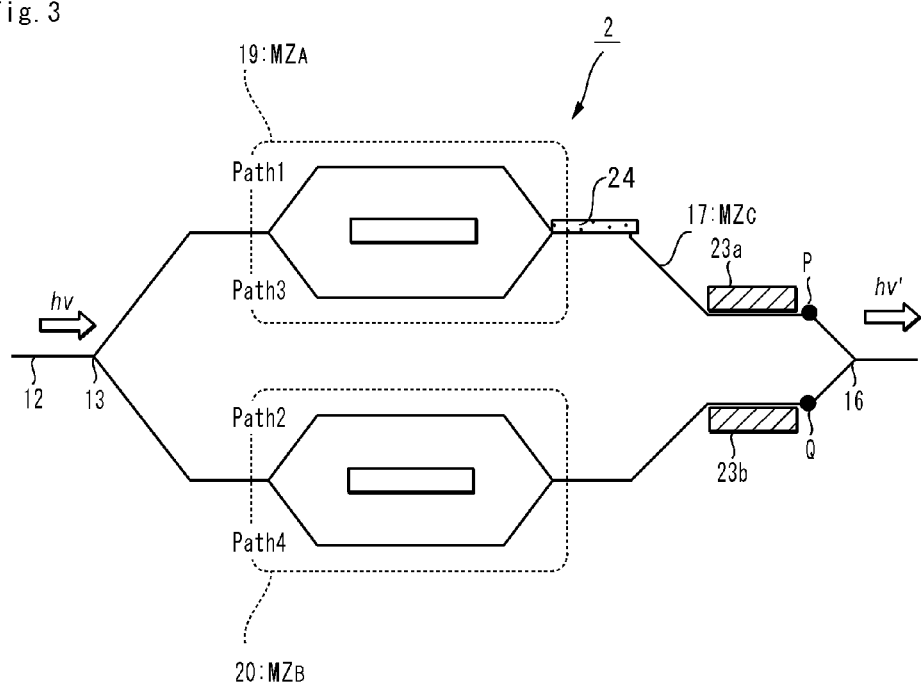
FIG. 3 is a schematic diagram showing an optical intensity modulator according to a certain embodiment of the present invention.

FIG. 3 is a schematic diagram showing an optical intensity modulator according to a certain embodiment of the present invention. This optical intensity modulator is an improved type of the one shown in FIG. 2. In the optical intensity modulator, the third electrode may be two-electrode type electrode ($23a$, $23b$), and an optical intensity compensation mechanism (24) may be provided on one of the two arms. Since the optical intensity modulator having this configuration can adjust light intensity or optical phase more desirably, a higher extinction ratio can be obtained.

Optical Switch

The optical switch (3) is a device for switching output paths from the optical intensity modulator (2). In particular, the optical switch (3) switches an optical path from the optical intensity modulator (2) to the first waveguide (4) or the second waveguide (6).

As the optical switch (3), a publicly known optical switch used in optical information communication can be used. As the optical switch, in particular, a publicly known coupler (a directional coupler) or a light shutter can be used. Switching over of the waveguides by the optical switch (3) is preferably controlled by a control part. In case a coupler is used as the optical switch (3), a waveguide is switched by a control part controlling voltage applied to the coupler which is configured to be applied with electric field. A mechanical light shutter can switch waveguides easily by opening and closing the shutter or by shifting the shutter. But since a high-speed switching operation of the optical switch is required in general, a preferable optical switch is one such as a coupler which can perform the switching operation of waveguides by adjusting voltage or electric field intensity.

Optical Attenuator

The optical attenuator (5) is a device for attenuating light intensity. As an attenuator, a publicly known optical attenuator used in optical information communication can be used. The optical attenuator (5) is provided on the first arm (4) which is switched by the optical switch (3).

Light Intensity Measurement Device

As the light intensity measurement device, a publicly known light intensity measurement device used in optical information communication can be used. The light intensity measurement device (7) is connected to the first and second waveguides (4, 6), and measures light intensity of light propagating through the first and second waveguides (4, 6). As the light intensity measurement device, in particular, a power meter, an optical spectrum analyzer, and a photodiode can be used. In the present invention, since the light intensity measurement device obtains information on light intensity, a power meter or an optical spectrum analyzer is preferable. A light intensity measurement device is calibrated properly by the calibration device of the present invention.

Control Device

The control device (8) receives the light intensity measured by the light intensity measurement device (7), and controls a signal applied to the optical intensity modulator (2).

In the other preferable embodiment of the control device, a control device receives and stores the light intensity measured by the light intensity measurement device (7); and controls a signal applied to the optical intensity modulator (2).

In the other preferable embodiment of the control device, the control device (8) performs one or a plurality of times of the following cycle which comprises the steps of: controlling the optical switch (3) so that waveguide is switched to the first waveguide (4); making the optical attenuator (5) perform a certain amount of optical attenuation; receiving and storing the light intensity measured by the light intensity measurement device (7); controlling the optical switch (3) so that the waveguide is switched to the second waveguide (6); and controlling the signal being applied to the optical intensity modulator (2) so that the light intensity measured by the light intensity measurement device (7) becomes equal to the stored light intensity.

The control device is, for example, implemented by a publicly known computer. A computer, not specifically shown in figures, comprises a CUP, a memory, an I/O (input output) device, and a display. And the CUP, the memory, the I/O (input output) device, and the display are connected by bus, and are able to transmit data between each other. The memory acts as a memory part having a main memory as well as a memory serving as a work area or a short term memory. The main memory includes a program that makes a computer acts as the control device above described, thereby performing a certain arithmetic processing. Thus, the main memory acts as a control device. Certain arithmetic information is inputted to the computer from outside via the I/O device.

In the other preferable embodiment, the control device (8) receives the light intensity measured by the light intensity measurement device (7), controls signal being applied to the optical intensity modulator (2) and a switching of the optical switch (3).

In the other preferable embodiment, the control device (8) receives the light intensity measured by the light intensity measurement device (7), controls a signal being applied to the optical intensity modulator (2) and attenuation of the optical attenuator (5).

In the other preferable embodiment, the control device (8) performs one or a plurality of times of the following cycle which comprises the steps of: controlling the optical switch (3) so that waveguide is switched to the first waveguide (4); making the optical attenuator (5) perform a certain amount of optical attenuation; receiving and storing the light intensity measured by the light intensity measurement device (7); controlling the optical switch (3) so that the waveguide is switched to the second waveguide (6); and controlling the signal being applied to the optical intensity modulator (2) so that the light intensity measured by the light intensity measurement device (7) becomes equal to the stored light intensity A preferable embodiment of the calibration device of the present invention is as follows. The calibration device comprises a temperature measurement device for measuring temperature of the light intensity measurement device (7) and the optical intensity modulator (2). The memory of the control device stores a compensation value based on temperatures of the light intensity measurement device (7) and the optical intensity modulator (2) in advance. And the control device, based on temperature information inputted from the temperature measurement device, reads out the compensation value and adjusts a signal outputted from the signal source. The calibration device of this embodiment is preferable because a calibration operation which corresponds more suitably to temperature changes of the light intensity measurement device (7) and the optical intensity modulator (2) can be performed.

Signal Source

As the signals source, a publicly known signal source used for a light intensity measurement device can be used. A publicly known signal source which can receive the control signal from the control device (8) and adjust a signal applied to the optical intensity modulator (2) can be used. In case the optical intensity modulator shown in FIG. 2 or FIG. 3 is used, ones having a voltage source applying bias voltage (low frequency signal) to the two sub Mach-Zehnder waveguides and the main Mach-Zehnder waveguide, for example, can be used. These signal sources are connected with adjustment mechanisms adjusting, for example, phase, intensity, frequency, apply timing, and the like of an electric signal. And the phase and the like are adjusted as needed. The adjustment amount may be fixed, or may be controlled by a control part such as a computer connected to each adjustment mechanisms.

The voltage source generates direct current signal or alternate current signal. And the signal, having been adjusted one or more of phase, intensity, frequency or apply timing of the signal as needed, three kinds of signals ($DC_A$ voltage, $DC_B$ voltage, $DC_C$ voltage) are applied to the optical modulator (1).

The voltage source may have function of superimposing a high frequency signal to the above direct current signal or alternate current signal. Frequency ($f_m$) of the high frequency signal is, for example, 20 to 100 kHz, 20 kHz to 20 MHz, and 20 MHz to 100 GHz. An output of a high frequency electric signal source is, for example, a sinusoidal wave having a fixed frequency.

Manufacturing Method of Calibration Device

The calibration device of the present invention can be manufactured by combining certain known elements together as needed.

Operation of Calibration Device

Basic operation of the calibration device is explained in the following. In the beginning, the control part controls the optical switch (3) so that the waveguide is switched to the first waveguide (4). And the control part controls the attenuator (5) to perform a certain amount of optical attenuation. Then, the light intensity measurement device (7) measures light intensity or extinction ratio. The control part receives the light intensity measured by the light intensity measurement device (7), calculates extinction ratio, and stores the extinction ratio. Or the control part receives extinction ratio measured by the light intensity measurement device (7), and stores the extinction ratio. Next, the control part controls the optical switch so that the waveguide is switched to the second waveguide (6). And a signal applied to the optical intensity modulator (2) is controlled based on a direction from the control part so that the light intensity measured by the light intensity measurement device (7) becomes the same as the stored light intensity.

The operational procedures may be as follows. In the beginning, the control part controls the optical switch so that the waveguide is switched to the second waveguide (6). Then the control part receives extinction ratio information. And the control part makes the attenuator (5) perform a certain amount of optical attenuation based on the extinction ratio information. This control can be easily performed by the control device of the present invention. The control device may control the attenuator (5) to attenuate light intensity by a certain amount which is obtained by dividing an extinction ratio by, for example, a predetermined number (e.g., an integer from 1 to 100).

And repeat the above attenuation cycle one or a plurality of times (preferably predetermined times). Thus, calibration operation can be realized.

Operation Example of Calibration Device

In case that light intensity measured by the light intensity measurement device is 70 dB, for example, a light signal, whose light intensity is attenuated by 10 dB by the optical attenuator (5), is propagated through the first waveguide (4) to the light intensity measurement device (7), and the light intensity of the propagated signal is measured by the light intensity measurement device (7). The attenuation amount may be predetermined and attenuation may be performed by that amount. The attenuation amount may be the same as the light intensity of the output from the optical intensity modulator (2). The attenuation amount also may be set to, for example, ½ to ¹⁄₁₀ of the light intensity of the output from the optical intensity modulator (2), and the attenuation may be performed several times. And the control part (8) stores the detected light intensity. Then, the control part controls the optical switch (3) so that the waveguide is switched to the second waveguide (6). And a signal which adjusts light intensity of the optical intensity modulator (2) is outputted from the signal source (9), thereby adjusting the light intensity to be about the same level as the stored light intensity. By repeating the above adjustment cycle seven times, calibration operation can be properly performed.

The present invention can be preferably used in the field of optical measurement.

What is claimed is:

1. A calibration device for a light intensity measurement device comprising:
    an optical switch for switching output paths from an optical intensity modulator;
    a first waveguide being switched by the optical switch;
    an optical attenuator being provided on the first waveguide;
    a second waveguide being switched by the optical switch;
    a light intensity measurement device being connected to the first waveguide and the second waveguide, the light intensity measurement device measuring light intensity of light propagating through the first waveguide or the second waveguide;
    a control device receiving the light intensity measured by the light intensity measurement device, the control device controlling a signal being applied to the optical intensity modulator; and
    a signal source receiving control signal from the control device, the signal source adjusting signal being applied to the optical intensity modulator;
    wherein the control device receives the light intensity measured by the light intensity measurement device, controls signal being applied to the optical intensity modulator and a switching of the optical switch, and
    wherein the switching of the optical switch is controlled by the control device.

2. A calibration device for a light intensity measurement device comprising:
    an optical switch for switching output paths from an optical intensity modulator;
    a first waveguide being switched by the optical switch;
    an optical attenuator being provided on the first waveguide;
    a second waveguide being switched by the optical switch;
    a light intensity measurement device being connected to the first waveguide and the second waveguide, the light intensity measurement device measuring light intensity of light propagating through the first waveguide or the second waveguide;
    a control device receiving the light intensity measured by the light intensity measurement device, the control device controlling a signal being applied to the optical intensity modulator; and
    a signal source receiving control signal from the control device, the signal source adjusting signal being applied to the optical intensity modulator;
    wherein the control device receives the light intensity measured by the light intensity measurement device, controls a signal being applied to the optical intensity modulator and attenuation of the optical attenuator, and
    wherein the attenuation of the optical attenuator is controlled by the control device.

3. A calibration device for a light intensity measurement device comprising:
    an optical switch for switching output paths from an optical intensity modulator;
    a first waveguide being switched by the optical switch;
    an optical attenuator being provided on the first waveguide;
    a second waveguide being switched by the optical switch;
    a light intensity measurement device being connected to the first waveguide and the second waveguide, the light intensity measurement device measuring light intensity of light propagating through the first waveguide or the second waveguide;

a control device receiving the light intensity measured by the light intensity measurement device, the control device controlling a signal being applied to the optical intensity modulator; and a signal source receiving control signal from the control device, the signal source adjusting signal being applied to the optical intensity modulator;

wherein the control device performs one or a plurality of times of the following cycle, the cycle comprising the steps of:

controlling the optical switch so that waveguide is switched to the first waveguide;

making the optical attenuator perform a certain amount of optical attenuation;

receiving and storing the light intensity measured by the light intensity measurement device;

controlling the optical switch so that the waveguide is switched to the second waveguide; and controlling the signal being applied to the optical intensity modulator so that the light intensity measured by the light intensity measurement device becomes equal to the stored light intensity.

4. A calibration method for a light intensity measurement device using a calibration device for a light intensity measurement device, the device comprising:

an optical switch for switching output paths from an optical intensity modulator;

a first waveguide being switched by the optical switch;

an optical attenuator being provided on the first waveguide;

a second waveguide being switched by the optical switch;

a light intensity measurement device being connected to the first waveguide and the second waveguide, the light intensity measurement device measuring light intensity of light propagating through the first waveguide or the second waveguide;

a control device receiving the light intensity measured by the light intensity measurement device, the control device controlling a signal being applied to the optical intensity modulator; and a signal source receiving control signal from the control device, the signal source adjusting signal being applied to the optical intensity modulator, wherein the method performs one or a plurality of times of the following cycle, the cycle comprising the steps of:

controlling the optical switch so that waveguide is switched to the first waveguide;

making the optical attenuator perform a certain amount of optical attenuation;

receiving and storing the light intensity measured by the light intensity measurement device;

controlling the optical switch so that the waveguide is switched to the second waveguide; and controlling the signal being applied to the optical intensity modulator so that the light intensity measured by the light intensity measurement device becomes equal to the stored light intensity.

* * * * *